United States Patent
Meetze

Patent Number: 5,960,615
Date of Patent: Oct. 5, 1999

[54] SWIVELING WHEEL ATTACHMENT FOR A LAWNMOWER

[76] Inventor: Henry B. Meetze, 1020 St. Peters Church Rd., Chapin, S.C. 29036

[21] Appl. No.: 09/139,093

[22] Filed: Aug. 24, 1998

[51] Int. Cl.$^6$ .................................................. A01D 34/03
[52] U.S. Cl. ............................ 56/16.7; 56/17.2; 56/322; 16/35 R
[58] Field of Search .................... 56/16.7, 17.2, 56/322, DIG. 3, DIG. 10, DIG. 7; 16/35 R

[56] References Cited

U.S. PATENT DOCUMENTS

| | | | |
|---|---|---|---|
| 2,709,829 | 6/1955 | Marvin | 16/35 D |
| 2,825,196 | 3/1958 | Gudmundsen | 56/17.2 |
| 2,836,430 | 5/1958 | Langenbacher | 37/243 |
| 2,882,063 | 4/1959 | Strasel | 56/17.2 |
| 2,905,275 | 11/1959 | Kostolecki et al. | 16/35 R |
| 2,915,318 | 12/1959 | Chesser | 56/17.2 |
| 4,942,726 | 7/1990 | Bowditch | 56/17.2 |
| 4,998,948 | 3/1991 | Osterling | 56/16.7 |
| 5,086,614 | 2/1992 | Pestka | 56/17.2 |
| 5,179,823 | 1/1993 | Pace | 56/16.9 |
| 5,463,855 | 11/1995 | Johnson et al. | 56/17.2 |
| 5,490,371 | 2/1996 | Potucek, III | 56/17.2 |
| 5,669,100 | 9/1997 | Carpenter | 16/35 R |
| 5,809,756 | 12/1996 | Scag et al. | 56/16.7 |
| 5,819,514 | 7/1996 | Firdaus | 56/16.7 |

FOREIGN PATENT DOCUMENTS

| 404293418 | 10/1992 | Japan | 56/16.7 |
|---|---|---|---|
| 807207 | 1/1959 | United Kingdom | 56/16.7 |

Primary Examiner—Thomas B. Will
Assistant Examiner—Arpad Fabian Kovacs
Attorney, Agent, or Firm—Thomas L. Moses

[57] ABSTRACT

A swiveling wheel attachment for the front of a lawnmower, wherein the attachment includes a main body member having a rectangular side plate and a rectangular upper plate. The plates are formed at a right angle along a longitudinal side of each plate, so that the main body member is shaped like an upside down "L". The side plate defines a series of holes, or interconnected slots, which are used to connect the main body member to the front end of a lawnmower. The holes or slots are arranged in such a way that the height of the main body member may be adjusted relative to the lawnmower. The main body member is attached using threaded nuts and bolts. On the underside of the upper plate member, a pair of swiveling wheels are attached, so that the wheels may rotate in a 360 degree arc in a horizontal plane to facilitate maneuverability of the lawnmower. The swiveling wheel attachment is meant to replace the existing front fixed wheels of a standard push type lawnmower, so it is necessary to remove the fixed front wheels before attaching the swivel wheel attachment. In an alternate embodiment, a lawnmower includes an extended front end for housing a pair of swivel wheels, and having means for individually adjusting the height of each swivel wheel.

5 Claims, 2 Drawing Sheets

SWIVELING WHEEL ATTACHMENT FOR A LAWNMOWER

BACKGROUND OF THE INVENTION

1. Field of the Invention

The present invention relates generally to lawnmower attachments. Specifically, the present invention is a swiveling wheel attachment for the front of a lawnmower, wherein the attachment includes a main body member having a rectangular side plate and a rectangular upper plate. The plates are formed at a right angle along a longitudinal side of each plate, so that the main body member is shaped like an upside down "L". The side plate defines a series of holes, or interconnected slots, which are used to connect the main body member to the front end of a lawnmower. The holes or slots are arranged in such a way that the height of the main body member may be adjusted relative to the lawnmower. The main body member is attached using threaded nuts and bolts. On the underside of the upper plate member, a pair of swiveling wheels are attached, so that the wheels may rotate in a 360 degree arc in a horizontal plane to facilitate maneuverability of the lawnmower. The swiveling wheel attachment is meant to replace the existing front fixed wheels of a standard push type lawnmower, so it is necessary to remove the fixed front wheels before attaching the swivel wheel attachment. In an alternate embodiment, a lawnmower includes an extended front end for housing a pair of swivel wheels, and having means for individually adjusting the height of each swivel wheel.

One problem associated with standard fixed wheel push style lawnmowers is the difficulty in maneuvering the lawnmower around obstacles while mowing. Considerable effort is required by the operator to mow around trees, fences, flowerbeds and shrubbery. The operator is required to physically lift the front of the mower, by pushing down on the handle portion, in order to turn the mower to get around such obstacles, or to turn the mower around at the end of a row.

Therefore, it would be desirable to provide an improved lawnmower or an attachment for a lawnmower that would replace the fixed wheels with wheels that could swivel in a 360 degree arc in a horizontal plane. This arrangement allows for easier maneuverability, requiring less effort and exertion on the part of the operator. Further, the swiveling wheels allow for more exact mowing, so that it is easier to mow directly adjacent a tree or flower garden, without cutting the flowers, roots of a tree, or the like. It would also eliminate or reduce the frequent stopping and repositioning of the mower when turning around to complete another length-wise cut, saving the operator time and effort. The mower could simply be swung around in the same manner as a shopping cart. The blades of the machine would remain on the ground so that no area would remain uncut while turning.

2. Discussion of the Prior Art

| U.S. Pat. No. | Inventor |
| --- | --- |
| 5,667,032 | Kamlukin |
| 5,653,096 | Edwards |
| 4,942,726 | Bowditch |
| 4,346,547 | Allison |
| 3,782,085 | Parker, et al. |

The Kamlukin patent discloses a riding or walk-behind self-propelled lawn mower having pivoted rear axles so that the mower is steerable to a low turning radius as measured off a lateral edge of the mower deck. The rear wheels are supported on a crossbar which is fixed at its middle to the main frame, supports at its ends double universal joints, each of which drives one of the rear wheels, and together with the frame provides spaces into which the rear wheels may pivot during a minimum radius turn.

The Edwards reference teaches a lightweight mower mounted on three caster wheels, having locking pins by which the two front casters may be locked in a straight line position, parallel to the handle, rendering the unit a conventional straight line mower. It includes an extendable handle which will also rotate to the front of the mower, by means of a specially designed handle bracket, which will, when combined with the free wheeling rotation of the caster wheels in the unlocked position, create a free wheeling mower which will move in the direction of applied force, with additional reach which will allow the operator to mow downhill from himself, while pulling the mower in a lateral pattern.

The Bowditch reference discloses a mechanism and method for converting a fixed wheeled walk-behind mower into a caster wheel walk-behind mower and vice-versa comprising two caster wheel assemblies having wheels mounted in brackets journalled for rotation in frames. Each frame has means for attaching the mechanism to the front wheel axle. Each caster wheel assembly comprises an elongated member connected to each frame and extending the length of the mower on each side between the frame and the respective rear wheel axle or mower housing. A tie rod is provided for interconnecting the two frames.

The Allison patent discloses a lawnmower having a trailer hitch attached thereto for pulling the mower, and having a pair of mower blades and a pair of caster wheels supported on a frame by means of arms attached to the side of the platform and extending upwardly and forwardly therefrom, and having washers placed on the caster wheel rods for adjusting the height of the wheels.

The Parker reference discloses a rotary lawn mower including an engine, an edger-trimmer unit mounted on the mower and driven by the engine, power control means for engaging and disengaging the drive to the unit, and position control means for moving the unit between its edging and trimming positions. Coordinating means interrelates the power control means and the position control means to insure that the drive is always disengaged before the position control means can move the unit. Caster wheels are provided on the rear of the mower for ease of maneuvering and height control means engageable with the caster wheels raise and lower the mower to respectively lower and raise the unit.

None of the prior art provides for a single member attachment for the front of an existing fixed-wheel walk-behind lawnmower having swiveling wheels that may be adjusted to a desired vertical height relative to the lawnmower, and which may be installed using either two or four bolts.

SUMMARY OF THE INVENTION

Accordingly, it is an important object of the present invention to provide an attachment for a walk-behind lawnmower that may replace the front fixed wheels with wheels that swivel in a 360 degree arc in a horizontal plane, to facilitate maneuverability of the lawnmower.

Another important object of the invention is to provide an attachment for a walk-behind lawnmower that includes caster wheels that swivel, where the attachment may be adjusted vertically to adjust the height of the lawnmower and blade above the ground.

Yet another important object of the present invention is to provide an attachment for a walk-behind lawnmower that is easy and inexpensive to manufacture, and which is easily installed on a standard lawnmower.

Another important object of the present invention is to provide an attachment for a walk-behind lawnmower that overcomes some of the problems associated with other styles of lawnmowers.

Yet another important object of the present invention is to provide an improved lawnmower having an extended front portion with caster wheels attached thereto, and having height adjusting means for adjusting the height of each caster wheel.

These and other features, aspects, and advantages of the present invention will become better understood with regard to the following description, appended claims, and accompanying drawings.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF THE PREFERRED EMBODIMENT

Figure 1:
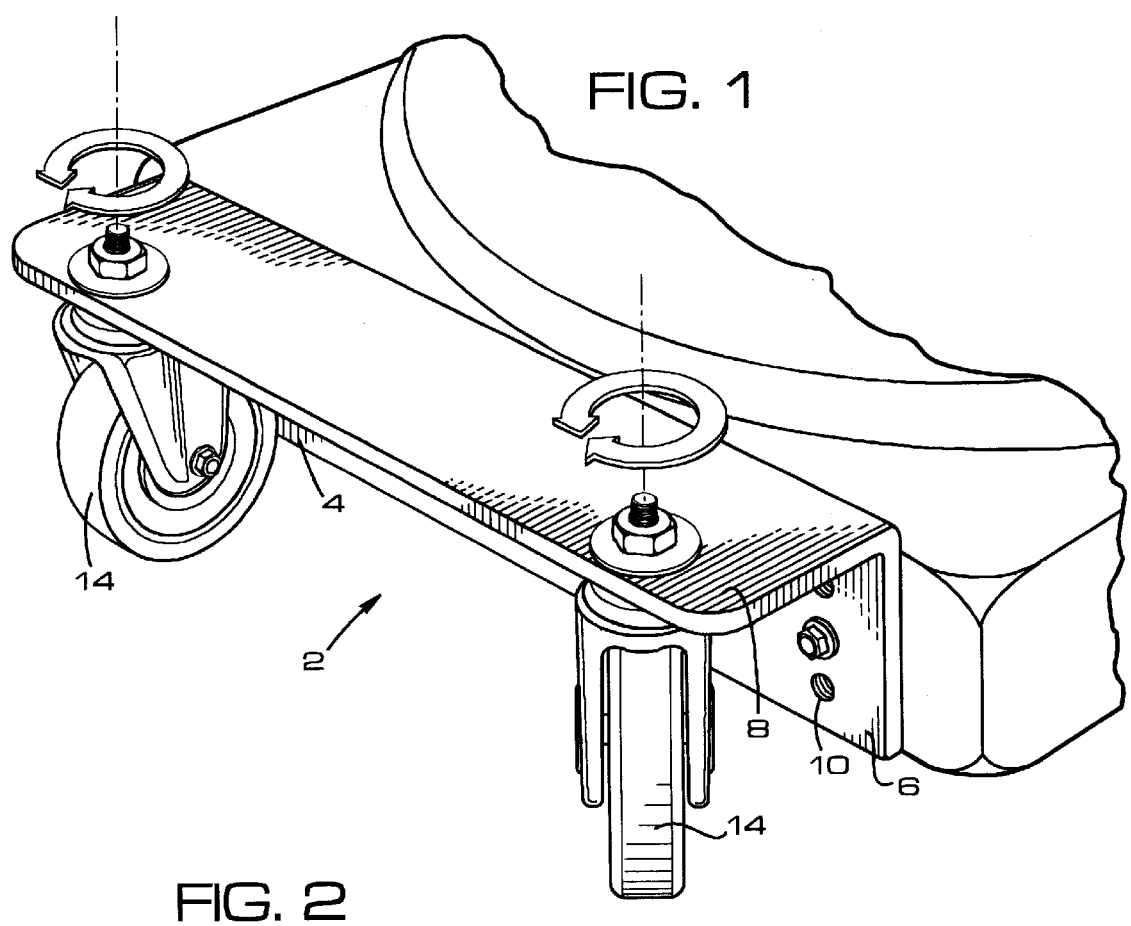
FIG. 1 is a perspective view of the swiveling wheel attachment for a lawnmower, showing holes in the side plate for attaching the unit to a standard walk-behind lawnmower.
Figure 2:
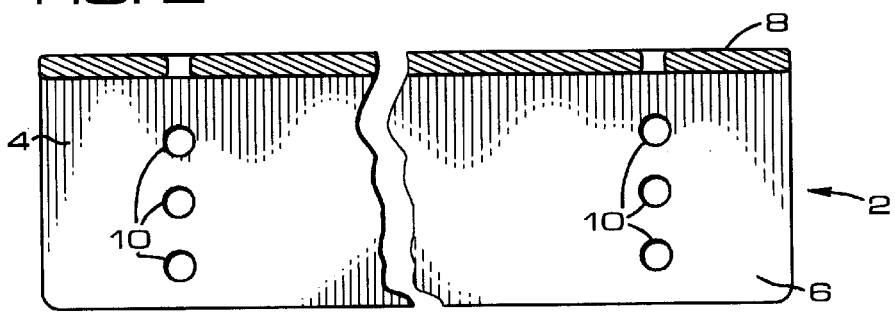
FIG. 2 is a perspective view of the swiveling wheel attachment for a lawnmower, showing interconnected slots in the side plate for attaching the unit to a standard walk-behind lawnmower, so that the unit may be adjusted vertically relative to the lawnmower for adjusting the height thereof.
Figure 3:
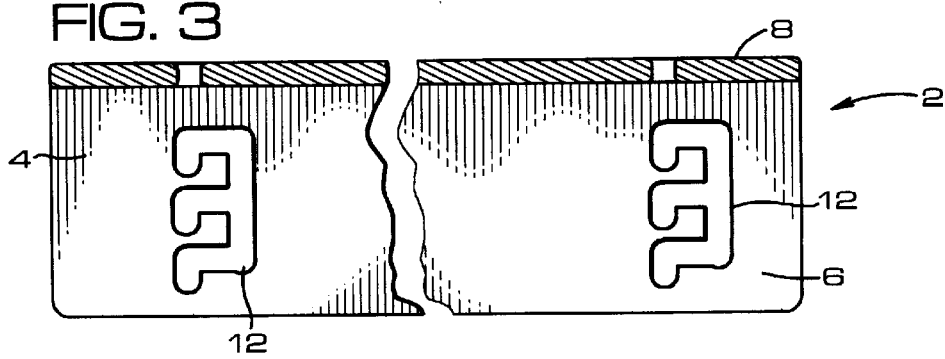
FIG. 3 is a perspective view of the swiveling wheel attachment for a lawnmower, shown as used in combination with a lawnmower.

FIG. 1 shows the swiveling wheel attachment 2 for a standard walk-behind lawnmower. The attachment includes a main body member 4 having a rectangular side plate 6 and a rectangular upper plate 8. The plates are formed at a right angle along a longitudinal side of each plate, so that the main body member is shaped like an upside down "L". The side plate defines a series of holes 10 (as shown in FIG. 1), or interconnected slots 12 (as shown in FIG. 2), which are used to connect the main body member to the front end of a lawnmower. The holes or slots are arranged in such a way that the height of the main body member may be adjusted relative to the lawnmower. The main body member is attached using threaded nuts and bolts. On the underside of the upper plate member, a pair of swiveling wheels 14 are attached, so that the wheels may rotate in a 360 degree arc in a horizontal plane to facilitate maneuverability of the lawnmower. The swiveling wheel attachment is meant to replace the existing front fixed wheels of a standard push type lawnmower, so it is necessary to remove the fixed front wheels before attaching the swivel wheel attachment.

In order to install the swiveling wheel attachment, an operator must remove the fixed front wheels from the lawnmower. Then, holes should be drilled in the front plate of the lawnmower, corresponding to the holes or slots defined by the side plate of the swiveling wheel attachment. The holes may be drilled using an instructional template, having spaced marks corresponding with the placement of the holes. The template is simply placed across the front of the mower, and the holes drilled through the markings on the paper and also through the front portion of the lawnmower. The swiveling wheel attachment is then aligned with the corresponding holes drilled in the front plate of the lawnmower, and threaded bolts are placed through the holes drilled in the lawnmower, and through the holes or slots defined by the side plate of the attachment. Threaded nuts, or in a preferred embodiment, wing nuts, are then screwed onto the bolts to secure the attachment to the lawnmower.

To adjust the height of the lawnmower on the front end, the bolts may be removed from the holes, and the unit may be realigned using a different set of vertically spaced holes on the attachment to reattach the unit to the mower. If the interconnected slots are used in conjunction with the side plate (as shown in FIG. 2), the bolts do not need to be removed. In the slot embodiment, the bolts may simply be loosened enough to slide the attachment so that the bolts engage one of the other vertically spaced slots located on the side plate of the attachment. The nuts are then retightened to secure the attachment to the lawnmower in the newly adjusted position.

This arrangement allows for easier maneuverability of the lawnmower, requiring less effort and exertion on the part of the operator. Further, the swiveling wheels allow for more exact mowing, so that it is easier to mow directly adjacent a tree or flower garden, without cutting the flowers, roots of a tree, or the like. It would also eliminate or reduce the frequent stopping and repositioning of the mower when turning around to complete another length-wise cut, saving the operator time and effort. The mower could simply be swung around in the same manner as a shopping cart. The blades of the machine would remain on the ground so that no area would remain uncut while turning.

Figure 4:
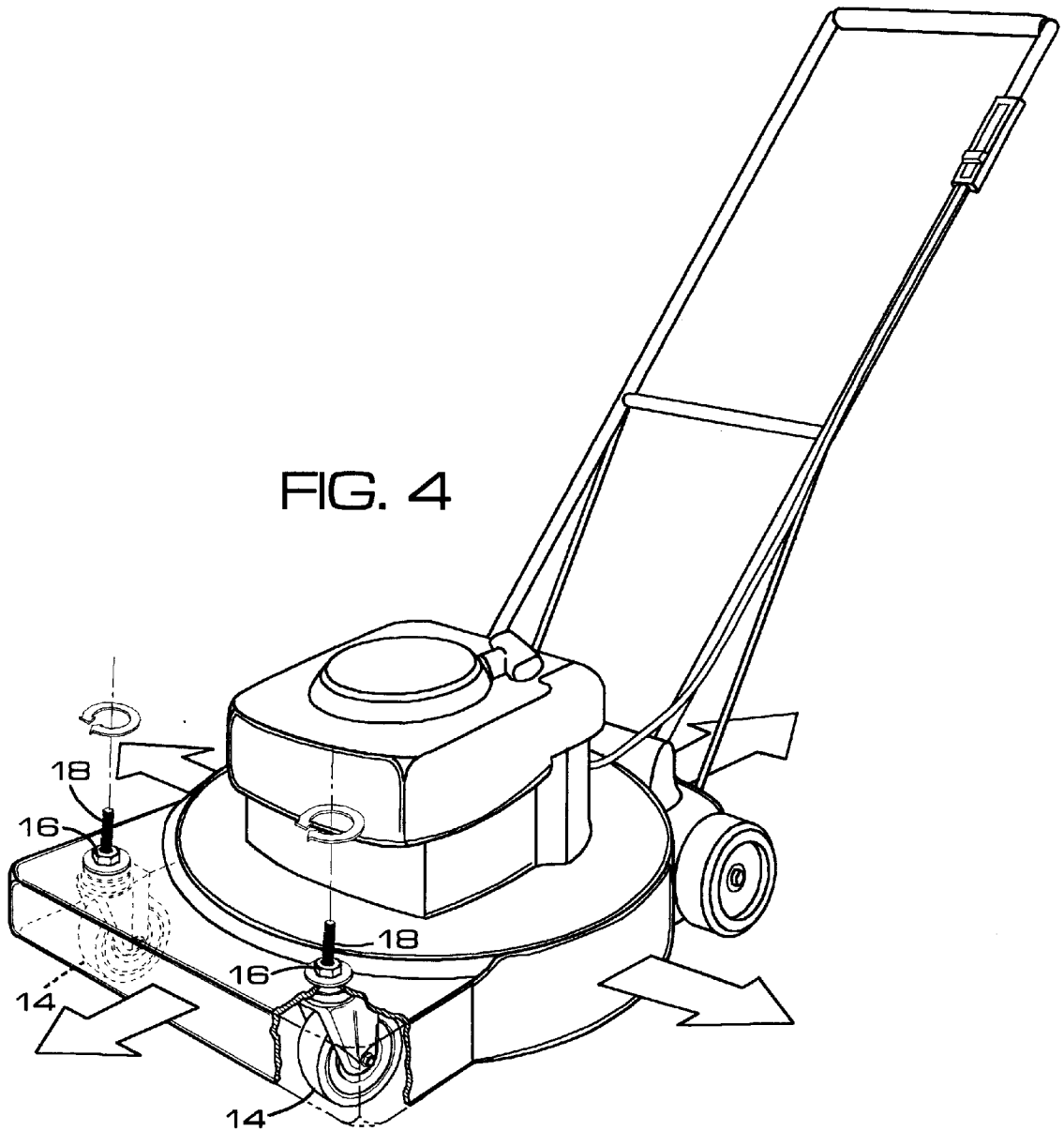
FIG. 4 is a perspective view of an alternate embodiment of the swivel wheel lawnmower, where the front portion of the lawnmower is extended slightly to accommodate swivel wheels thereunder, and where the swivel wheels have individual height adjusting means.

An alternate embodiment of the invention is shown in FIG. 4. In this alternate embodiment, the front end of the lawnmower is extended to accommodate a pair of front swivel wheels. The swivel wheels, preferably caster wheels, are attached through a hole defined by the extension on the front of the lawnmower. Each swivel wheel contains an elongated threaded stem, which is secured within the holes defined by the front of the lawnmower. A threaded nut is positioned on the upper side of the hole, to engaged with the threaded stem. Another threaded nut is positioned on the lower side of the hole, on each threaded stem. In order to adjust the height of the front swivel wheels, the nuts may be loosened, allowing the wheel to be raised or lowered, and the nuts are then tightened against the extended portion of the lawnmower after the wheel is set in its desired position.

While a preferred embodiment of the invention has been described using specific terms, such description is for illustrative purposes only, and it is to be understood that changes and variations may be made without departing from the spirit or scope of the following claims.

What is claimed is:

1. A front wheel attachment for a lawnmower, said front wheel attachment comprising:

a single main body member having a rectangular side plate and a rectangular upper plate, wherein said plates are formed at a right angle along a longitudinal side of each plate, so that said main body member is shaped like an upside down "L";

said single side plate having a series of holes for connecting said main body member to a front end of a lawnmower;

attaching means for attaching said side plate to said lawnmower;

a pair of swiveling wheels attached on opposing sides of an underside of said upper plate, so that said swiveling wheels may rotate in a 360 degree arc in a horizontal plane to facilitate maneuverability of said lawnmower.

2. The structure set forth in claim 1, wherein said series of holes defined by said side plate are arranged so that said main body member may be adjusted to vary the height of said lawnmower relative to said main body member.

3. The structure set forth in claim 1, where said attachment means are threaded bolts and nuts.

4. A front wheel attachment for a lawnmower, said front wheel attachment comprising:

a main body member having a rectangular side plate and a rectangular upper plate, wherein said plates are formed at a right angle along a longitudinal side of each plate, so that said main body member is shaped like an upside down "L";

attaching means for attaching said side plate to a front end of a lawnmower;

said side plate having a series of interconnected slots for connecting said main body member to said lawnmower, said slots being arranged so that the height of said main body member may be adjusted relative to said lawnmower, without having to remove said main body member from said lawnmower;

a pair of swiveling wheels attached to an underside of said upper plate, so that said swiveling wheels may rotate in a 360 degree arc in a horizontal plane to facilitate maneuverability of said lawnmower.

5. The structure set forth in claim 4, where said attachment means are threaded bolts and nuts.

* * * * *